May 22, 1928.

B. A. BROUGHTON

MOTOMETER LIGHT

Filed May 19, 1926

INVENTOR
B. A. Broughton
BY Hill Brock & West
Attys.

Patented May 22, 1928.

1,670,565

UNITED STATES PATENT OFFICE.

BERLIN A. BROUGHTON, OF CLEVELAND HEIGHTS, OHIO, ASSIGNOR TO DELTA ENGINEERING LABORATORIES, INC., OF CLEVELAND, OHIO, A CORPORATION OF OHIO.

MOTOMETER LIGHT.

Application filed May 19, 1926. Serial No. 110,082.

This invention is a novel means for illuminating the motometer in order that the driver may readily read the indications thereof at night.

Motometers are placed upon the radiator cap and at night more or less difficulty is encountered in reading the indications thereof even when sidelights upon the cowl of the automobile are employed.

The object of my invention, therefore, is to provide an apparatus which will direct a concentrated beam directly upon the motometer so that the indications thereof can be readily observed by the driver.

Another object of the invention is to provide a device which can be accurately adjusted upon the cowl of the automobile irrespective of the degree of inclination of the same.

Another object of the invention is to so arrange the various parts that the source of light which is utilized for concentrating the rays upon the motometer can also be utilized for illuminating the underside of the dashboard and also directing the light to the foot controls and transmission lock of the automobile.

With these and various other objects in view the invention consists in the novel features of construction and the manner of combining and arranging the same all of which will be fully described hereinafter and set forth in the appended claims.

Figure 1:
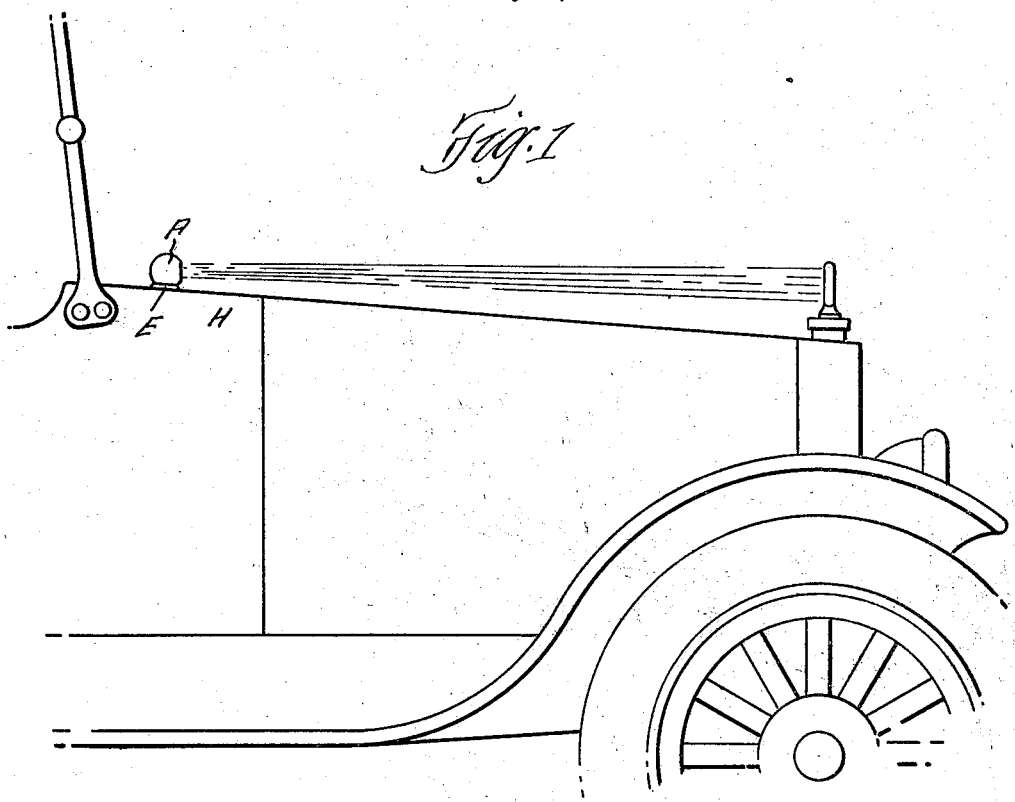
Figure 2:
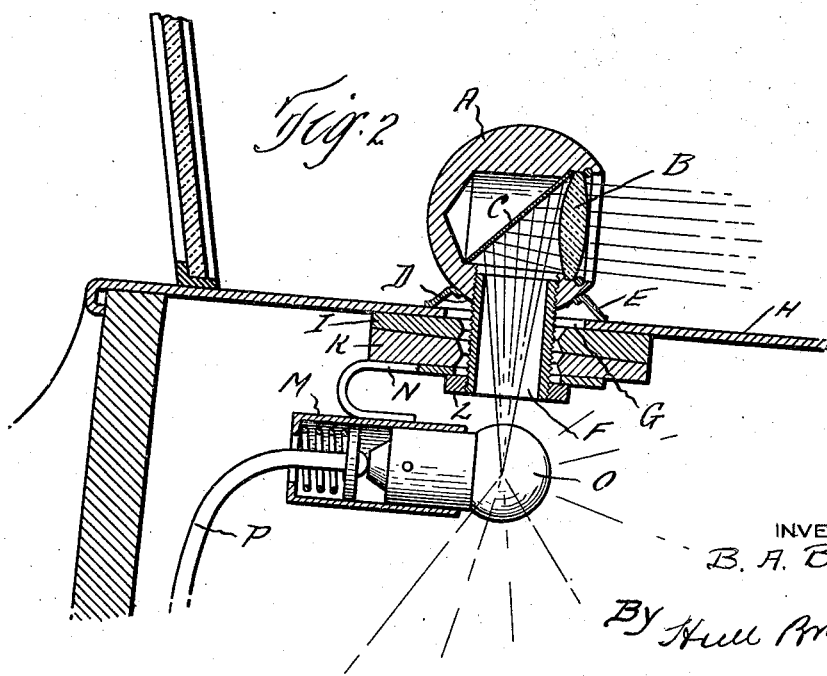

In the drawings forming part of this specification Fig. 1 is a view showing the practical application of my invention and Fig. 2 is a vertical sectional view of the same.

In carrying out my invention I employ a casing A which may be of any suitable material and having an opening at the forward side thereof in which is located a concentrating lens B. To the rear of the concentrating lens is a reflecting mirror C. The lower portion of the casing indicated at D has the curvature of a sphere and fits into a socket ring E. The casing itself is preferably spherical in shape except at the front but the casing as a whole can be of any desired shape but as before stated the lower portion thereof has the curvature of a sphere and in practice the mirror C is arranged in a plane passing through the center of this sphere.

Threaded into the lower end of the casing is a sleeve F, this sleeve extending through an opening G produced in the cowl H of the automobile and it will be noted that this opening G is considerably larger than the sleeve F. Upon the inner side of the cowl there are arranged two tapering washers I and K through which sleeves F passes and a nut L is screwed upon the lower end of the sleeve F and firmly binds all parts together, that is to say, the casing, socket ring, washers and sleeve and in addition I preferably support the lamp socket M by means of a bracket N which has an opening through which the sleeve passes and the fastening nut L binds this bracket firmly into engagement with the tapered washers I and K. The incandescent bulb O is fitted into the socket M, said socket having the conductor wires P leading therefrom.

Owing to the shape of the casing it can be properly adjusted in the socket ring and by means of the tapered washers an accurate adjustment can be had irrespective of the inclination of the cowl H inasmuch as the openings through the cowl and the washers are sufficiently large to permit such adjustments and then by tightening up on the binding nut L all of the parts are securely fastened together.

The rays of light emanating from the incandescent bulb pass upwardly through the sleeve F and strike the reflecting mirror C and are directed through the lens B and are concentrated upon the motometer and it is for the purpose of permitting such concentration that the casing is given the spherical form and the two tapering washers provided together with the relative arrangement of the lamp mirror and lens.

In addition to providing the source of light for concentrating the rays upon the motometer ample light will be provided upon the rear side of the instrument panel and also the foot controls and transmission lock.

It will thus be seen that I provide a simple and highly efficient device capable of carrying out all of the objects hereinbefore recited.

Having thus described my invention, what I claim is:—

1. In a device of the kind described, the combination with a casing having a lens and a reflector, said casing also having an inwardly extending sleeve, a socket ring into which the casing fits and through which the sleeve passes, tapered washers through which the ring passes, a nut upon the inner end of said sleeve, a bracket carried by the sleeve, a socket connected to said bracket and an incandescent bulb fitted into said socket and having a source of light in alignment with the sleeve, the openings in the washers and socket ring being sufficient to permit angular adjustment of the casing for the purpose specified.

2. In a device of the kind described, the combination of a cowl of an automobile, of a source of light arranged upon the interior of said cowl, a casing arranged upon the exterior of said cowl, said casing having a reflector and a transparent light projecting screen, said casing having an opening in the bottom thereof and adjustable means for connecting the casing to the cowl, said means including a tubular member in alignment with the source of light.

3. In a device of the kind described, the combination of a cowl of an automobile, of a casing provided with a reflector and a transparent light projecting screen, said casing having an opening in the bottom thereof, means for adjustably connecting said casing to said cowl, said means including a tubular member, a bracket connected to said tubular member, a socket connected to said bracket and a lamp arranged in said socket, said lamp being in alignment with the tubular connection member and the opening in the bottom of the casing.

In testimony whereof, I hereunto affix my signature.

BERLIN A. BROUGHTON.